United States Patent [19]

Hambric

[11] Patent Number: 4,590,820
[45] Date of Patent: May 27, 1986

[54] ROTATIONAL POWER TRANSMISSION APPARATUS

[75] Inventor: James C. Hambric, Wellsville, N.Y.

[73] Assignee: Dresser Industries, Inc., Dallas, Tex.

[21] Appl. No.: 480,678

[22] Filed: Mar. 31, 1983

[51] Int. Cl.[4] .................. F16H 37/04; F16H 57/04
[52] U.S. Cl. ............................... 74/640; 74/467
[58] Field of Search .............. 74/802, 801, 460, 467,
74/640, 587, 468, 413, 414, 421 R, 410, 457;
184/6.12; 464/109, 149, 157

[56] References Cited

U.S. PATENT DOCUMENTS

| | | | |
|---|---|---|---|
| 1,223,259 | 4/1917 | Cottam | 74/802 |
| 1,459,964 | 6/1923 | Alquist | 74/410 |
| 2,091,637 | 8/1937 | Hoffman et al. | 74/410 |
| 2,114,807 | 4/1938 | McCavitt | 464/158 |
| 2,168,814 | 8/1939 | Willgoos | 74/421 R |
| 2,231,784 | 2/1941 | Von Thüngen | 74/410 |
| 2,380,113 | 7/1945 | Kuhns | 464/154 |
| 2,687,025 | 8/1954 | Wildhaber | 464/158 |
| 2,722,851 | 11/1955 | Steiner | 74/802 |
| 2,743,592 | 5/1956 | Nagy | 464/149 |
| 2,759,376 | 8/1956 | Chamberlin et al. | 74/801 |
| 2,796,750 | 6/1957 | Crankshaw | 464/149 |
| 2,841,966 | 7/1958 | Belden et al. | 464/154 |
| 2,920,497 | 1/1960 | Wiken | 74/410 |
| 2,922,294 | 1/1960 | Wildhaber | 464/158 |
| 2,995,046 | 8/1961 | Mansachs | 74/410 |
| 3,146,629 | 9/1964 | Schmitter | 74/410 |
| 3,232,075 | 2/1966 | Wildhaber | 464/158 |
| 3,243,973 | 4/1966 | Kraeling | 464/154 |
| 3,331,217 | 7/1967 | Wildhaber | 464/158 |
| 3,380,555 | 4/1968 | Myers | 184/6.12 |
| 3,539,035 | 11/1970 | Wolkenstein | 74/467 |
| 3,550,724 | 12/1970 | Vollmer | 184/11.1 |
| 3,583,252 | 6/1971 | Shipitalo | 74/801 |
| 3,839,922 | 10/1974 | Heirsig et al. | 74/410 |
| 4,092,878 | 6/1978 | Campbell | 74/801 |
| 4,115,022 | 9/1978 | Orain | 192/108 |
| 4,237,750 | 12/1980 | Takahashi | 74/801 |
| 4,280,376 | 7/1981 | Rosen | 74/801 |
| 4,489,626 | 12/1984 | Lemon | 74/781 R |

FOREIGN PATENT DOCUMENTS

| | | |
|---|---|---|
| 897500 | 11/1953 | Fed. Rep. of Germany . |
| 7216501 | 3/1973 | Fed. Rep. of Germany . |
| 958710 | 3/1950 | France . |
| 1589002 | 4/1970 | France . |
| 93906 | 11/1972 | German Democratic Rep. . |
| 0137767 | 8/1982 | Japan .................. 184/6.12 |
| 141757 | 6/1920 | United Kingdom ........ 74/410 |
| 804223 | 11/1958 | United Kingdom . |

*Primary Examiner*—Lawrence J. Staab
*Assistant Examiner*—David A. Novais

[57] ABSTRACT

An apparatus as described for transmitting rotational energy from a prime mover having a first shaft to a torque load driven by a second shaft through a spur gear train. A splined shaft (30) having a sun gear (32) at one end is coupled to the prime mover. The sun gear (32) meshes spur-wise with three compound star gears (50). These star gears are positioned at approximately the same distance from the axis of the splined shaft. The star gears (50) drive a second sun gear (56) carried at the end of a second quill shaft (54) which is adapted to be connected to the torque load. Preferably the sun gears and the star gears are fully crowned and machined to have a high contact ratio such that at least two pairs of gear teeth of each mesh are substantially in contact at all times. Because one end of each quill shaft is supported by the compound star gears, the pitch circles of the associated sun gear and star gears are substantially tangent to each other thereby minimizing vibration, noise, and stress.

20 Claims, 5 Drawing Figures

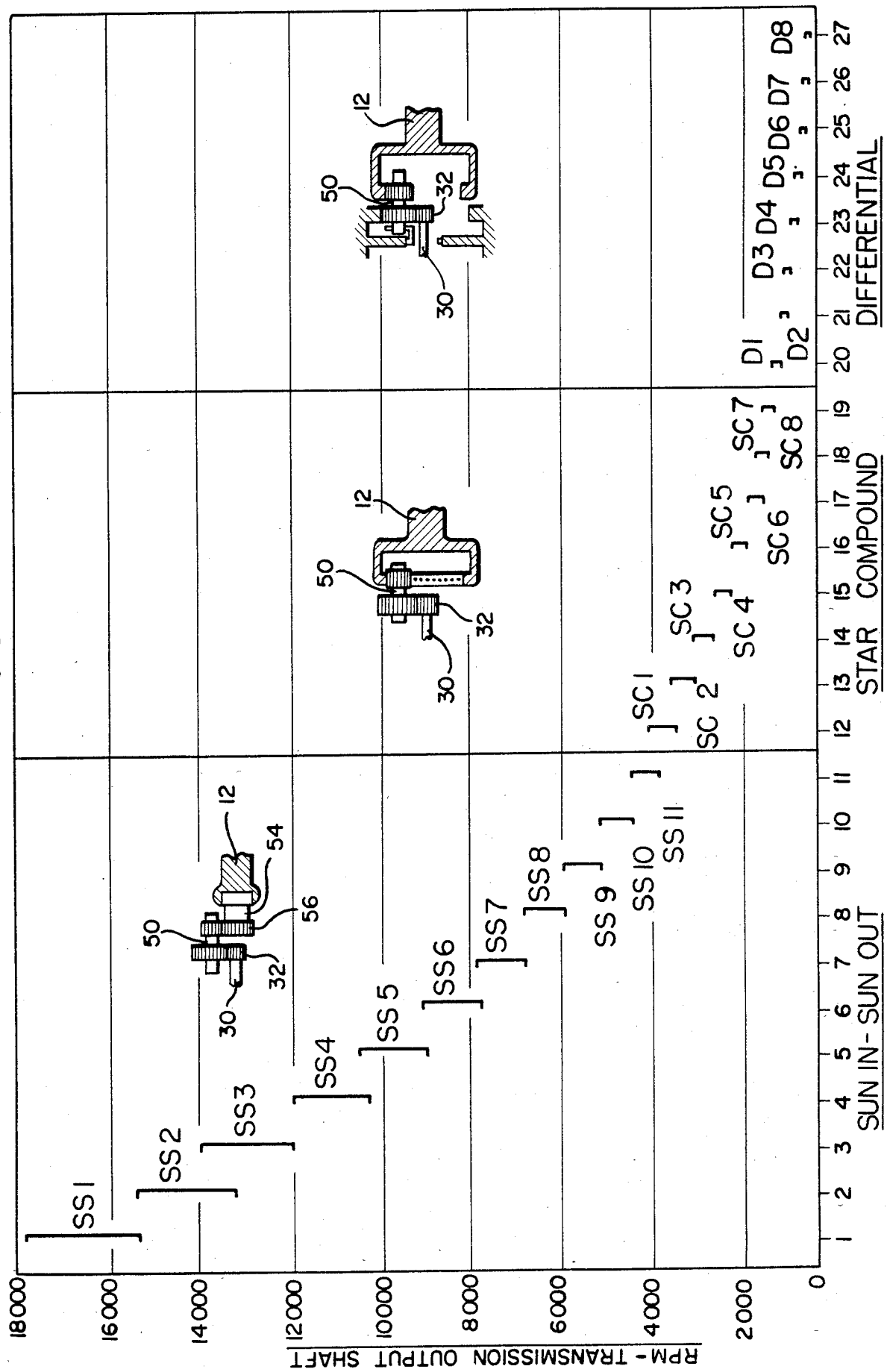

ROTATIONAL POWER TRANSMISSION APPARATUS

TECHNICAL FIELD

This invention relates to geared transmissions in general and, in particular, to those transmissions incorporating a plurality of compound star gears to drive an output shaft.

BACKGROUND OF THE INVENTION

Those skilled in the art know that fatigue is considered the major cause of bearing failure. The rating life of a sufficiently large group of apparently identical bearings is often defined as a number of revolutions that 90 percent of those bearings will complete or exceed before the first evidence of fatigue develops. This method assumes an exact alignment of the two members of the bearing which rotate relative to each other. For all practical purposes a perfectly aligned bearing cannot be achieved. Since one part of the bearing can be considered to be fixed relative to the other, angular misalignment between the two parts leads to a periodic overloading condition with a subsequent reduction in bearing life. In many rotating gear or reduction gear transmissions a shaft is supported at each end by a bearing. If the shaft is not perfectly aligned each bearing is not evenly loaded. When that shaft carries a driven component, such as a spur gear, the load imposed upon that component can result in the shaft's axis being periodically deflected or mis-aligned relative to the alignment of the two supporting bearings. The longer and more slender the shaft the more likely that this will occur. Thus, bearing life is not only affected by inaccurate machining of the bearing parts themself but also by the alignment of the bearing housing, or support, the misalignment of the rotating components, and the forces imposed on the bearing by these devices rotationably connected to the components supported by the bearing. It has been estimated that bearing life can be reduced by as much as 20 percent if that bearing is misaligned to the largest or to the greatest extent usually permitted by a bearing manufacture's published specifications.

In an elementary planetary transmission, star gears (compound type) are mounted in or on a fixed carrier assembly. A sun gear at the interior of the carrier drives the star gears and another sun gear is driven by the star gears (i.e., a so-called "sun - sun transmission). In addition to the sun - sun transmission there is the star compound configuration and the differential transmission. In the star compound, the axis of the star gears are fixed and the star gears drive a rotating ring gear coupled to the output shaft of the transmission. In the differential transmission the star gears are mounted within a rotating carrier (i.e., the star gears become planetary gears) with one end of each planetary gear rotating within a fixed ring gear and with the other end driving a rotating ring gear which is coupled to the output shaft of the transmission. Clearly, if there are alignment errors with respect to the axes of the gears and the axes of the supporting bearings, the load imposed is not uniform. This not only leads to an eventual fatigue failure but also to excessive abrasion, vibration and noise. More importantly this mis-alignment can be manifested by a power loss across the transmission.

There have been several attempts to resolve this loading problem. For example, Campbell in U.S. Pat. No. 4,092,878 employs a floating carrier. Shipitalo in U.S. Pat. No. 3,583,252 employs a series of additional intermediate gears and sun gears which are roller gears. Takahashi in U.S. Pat. No. 4,237,750 uses a "floating intermediate ring" to enhance the spring action of an oil film thereby improving the load balance on a set of planetary gears. Others have approached the problem by using unique gear shapes: U.S. Pat. Nos., 4,280,376; 4,115,022; 3,331,217; 3,232,075; 2,922,294; 2,687,025; and 2,114,807. Flexible couplings have also been suggested: U.S. Pat. Nos. 2,380,113; 2,841,966; and 3,243,973. Clearly those skilled in the art have not found a universally satisfactory solution to the mis-alignment problem. More importantly a simple and otherwise innovative and practical approach to this design problem is needed.

SUMMARY OF THE INVENTION

Briefly, the present invention is an apparatus for transmitting rotational energy, from a prime mover having a first shaft, to a torque load driven by a second shaft. The apparatus comprises a third shaft disposed coaxially between the first shaft and the second shaft; spur gear train means, having at least three compound star gears, for rotating the second shaft, each of the star gears defining a first reduction gear and a first reduction pinion, the first reduction pinions being rotationally coupled to the second shaft; a first spur gear, meshing individually with the first reduction gears, at one end of the third shaft; and coupling means for coupling the opposite end of the third shaft to the first shaft. In this configuration the pitch circle of the first spur gear remains substantially tangent to the pitch circles of the first reduction gears.

As used herein the term "spur gear" shall mean a gear wheel with radial teeth parallel to the gear wheel axis of rotation. As used in this definition the phrase "teeth parallel to the gear wheel axis of rotation" means that the teeth are non-helical such that a line drawn along the face of any one of the radial teeth would be parallel to the rotational axis of the spur gear. In contrast, a line drawn along the face of a helical gear or a slant cut gear would be skewed from parallel with the rotational axis such that a helical gear or a slant cut gear is not included within the definition of "spur gear".

In accordance with the present invention an apparatus is provided for transmitting rotational energy from a prime mover having a first shaft to a torque load driven by a second shaft through a spur gear train having at least three compound star gears wherein rotation is transmitted to and from the star gears by means of free floating spline shafts. In particular, each spline shaft has a sun gear at one end which meshes with the three compound star gears. The opposite end of one of the quill shafts is splined to the output shaft of the prime mover. The other quill shaft is splined to the output shaft of the transmission. Because one end of the quill shafts is supported by the compound star gears, the pitch circle of the sun gear on that shaft is substantially tangent to the pitch circles of the associated star gears. Preferably, the sun gears and the star gears are fully crowned and are made to have a high contact ratio such that at least two pairs of gear teeth on the sun gear and the associated star gears are substantially in contact at all times. This may be accomplished in part as well known in the art with fully recessed gears or gears designed for recess contact action.

The advantages and features of the present invention will become readily apparent from the detailed description of the invention, the embodiments presented, the accompanying drawings and the claims.

BRIEF DESCRIPTION OF THE DRAWINGS

FIG. 4 is a simplified end view of the star gears and sun gears as viewed along line 4—4 of FIG. 3;

FIG. 5 is a pictorial chart of other transmission arrangements and the various reduction ratios which can be obtained from transmissions incorporating the principles of this invention.

DETAILED DESCRIPTION OF THE PREFERRED EMBODIMENT

Figure 1:
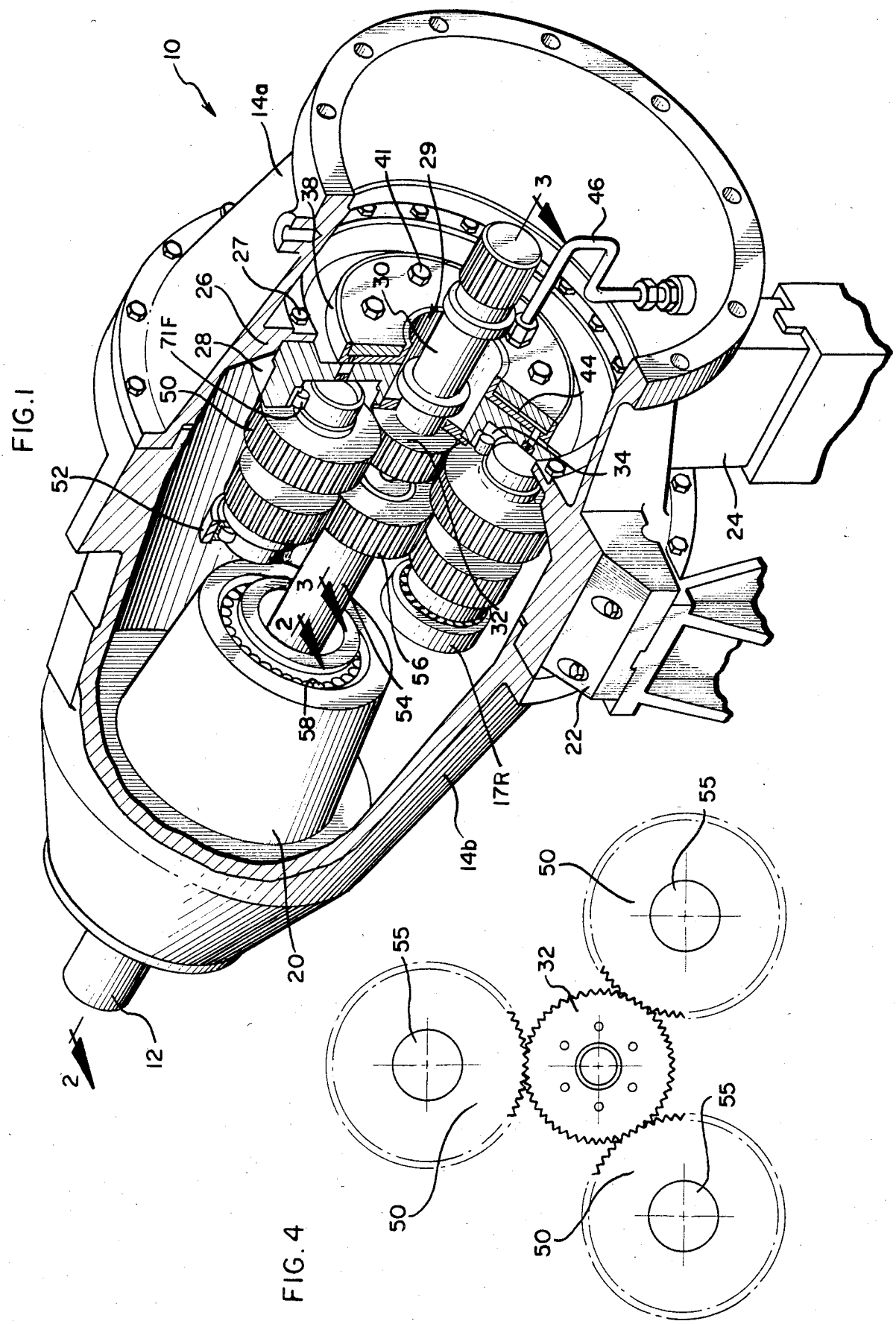
FIG. 1 is a perspective cutaway view of a transmission incorporating the subject invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the specific embodiment illustrated.

Turning to the drawings, FIG. 1 illustrates a modern transmission 10 adapted to be driven by and be coupled to the output shaft of a high-speed steam turbine. Different ratios of planetary gearing are used to satisfy the output speed requirement. Since a turbine is preferable operated at or near a second consistant with its optimum velocity ratio, the output speed of the transmission is designed to match the speed required by the load. In the case of a steam turbine operating at 20,000 rpm, a prototype differential transmission 10 has been designed which can efficiently drive the output shaft 12 in a speed range of 500 to 1200 rpm (See FIG. 5).

To better understand the unique method and apparatus that is the subject of the present invention, the overall environment of the invention and the principal components of the transmission 10 will now be described. The transmission 10 is housed within a generally cylindrical, vertically split, two-part casing 14a and 14b. The inboard (or turbine end) casing member 14a is generally frusto-conical in shape. The outboard of the inboard casing 14a is flange mounted to the outboard (or load end) casing 14b. A similar flange is provided at the inboard end to attach the transmission 10 to the prime mover or steam turbine w hich drives the transmission. The outboard casing 14b carries an output shaft bearing support member 20 whic h supports the output shaft 12. The inboard casing 14a is provided with two mounting shoes or pads 22 (the right-hand pad being hidden from view in FIG. 1) and an axial guide shoe 24. Centerline guided support, with a fixed output end, provides for uniform thermal expansion of the transmission gear casing away from the direction of the driven equipment. This assures that the driven equipment is unlikely to be subjected to unpredictable and potentially damaging stresses.

Figure 3:
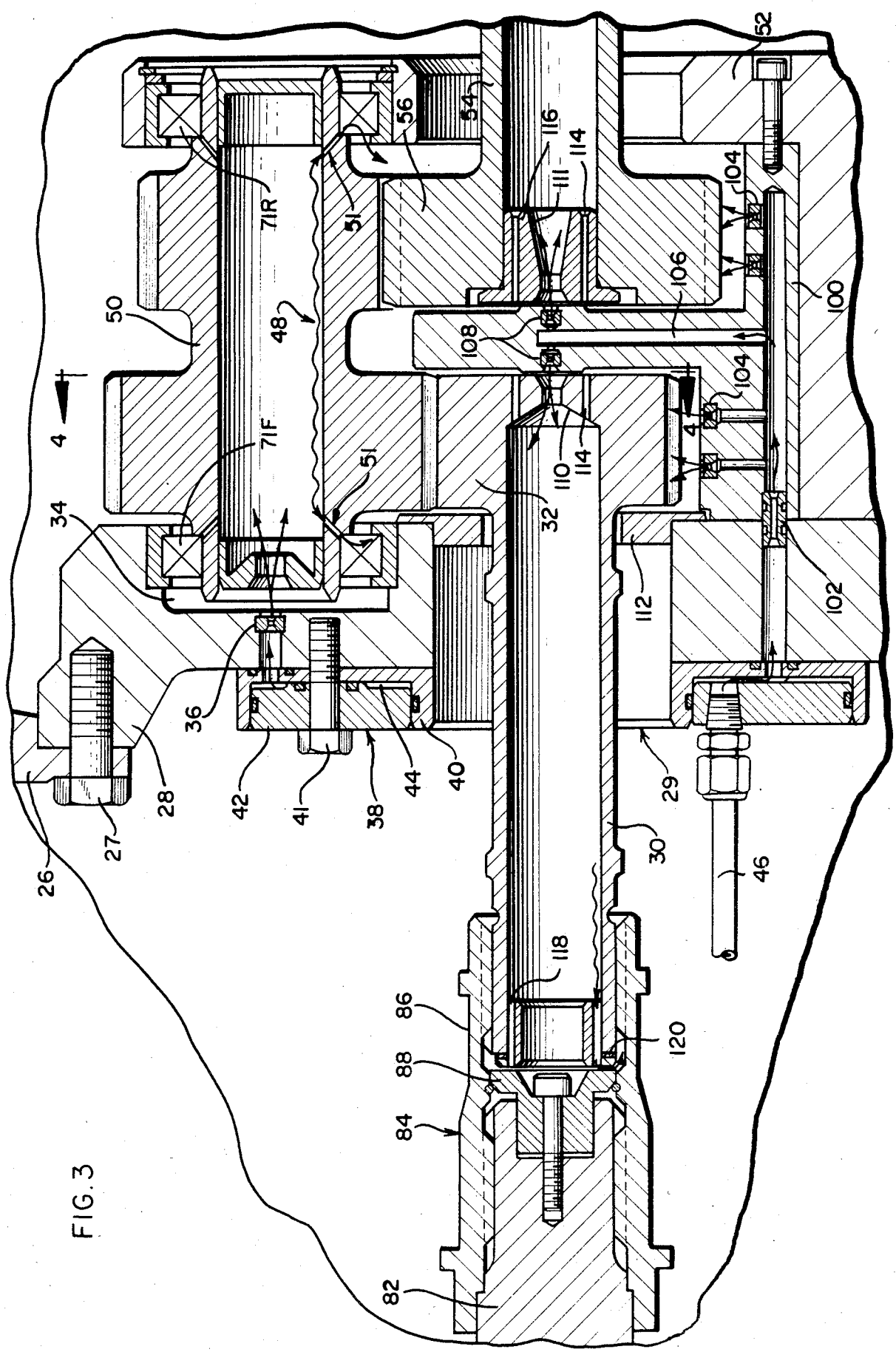

The components housed within the two-part transmission casing 14a and 14b will now be described. The inboard casing 14a defines an integal inwardly disposed pilot flange 26 which is used to mount the operating components of the transmission 10. A series of bolts 27 (See detail in FIG. 3) are used to connect a disk-like carrier support member 28 to the pilot flange 26 of the inboard housing 14a. The center of the support 28 is provided with an opening 29 as shown in FIGS. 1 and 3 through which a free floating input quill shaft 30 is disposed without receiving radial bearing support from opening 29 as shown in FIG. 3. The "free floating" or bearingless aspect of the hollow input quill shaft 30 will be described later. The input quill shaft 30 is splined at one end (the inboard end) to couple the quill shaft to the prime mover. The opposite or outboard end of the quill shaft 30 defines a first spur gear 32 or a first sun gear 32 which shall be referred to as sun gear 32. The outboard or rear end of the carrier support member 28 defines three bearing supports or mounts 34 for the associated star gears 50. More will be said about the star gears at a later point in this description.

Returning, to the inboard end of the transmission 10, the input quill shaft 30 is shown joined to the output shaft 82 of a prime mover, such as a steam turbine, by means of a splined coupling 84. The coupling 84 includes a collar 86 and a collar lock 88. The collar lock holds the collar 86 on the end of output shaft 82. The forward or inboard end of the carrier support 28 supports an oil distribution assembly 38. In this particular embodiment, the oil distribution assembly 38 includes a base cap 40, and a top cap 42. The top cap 42 is connected to a source of lubricating fluid under pressure or an oil supply 46. The base cap 40 and the top cap 42 are joined together by bolts 41 and define a series of interior passageways 44 (See FIG. 3) which channel oil to oil jets 36 mounted in the carrier support 28. The oil distribution jets 36 (not shown in FIG. 1 to simplify the drawing) supply oil (See flow arrows) to the interior of the revolving star gears 50 and the interior of the input quill shaft 30. Oil accumulating (by centrifugal force) along the interior walls (See arrow 48) of the star gears 50 is then channeled through openings 51 to lubricate the bearings at either end of the star gears.

Returning now to the outboard or rear side of the carrier support member 28, the three double compound star gears 50 (one of which is hidden from view in FIG. 1) are rotatably supported between the carrier support and a back plate 52 which is bolted to the support itself. As such, the back plate 52 and the fixed support member 28 form a "carrier" for the three star gears 50. Each end of each star gear 50 is supported by roller berings 71F and 71R. All rolling element bearings should be capable of accepting high surface stresses. VIMVAR-50 (double vacuum melt) steel construction is preferred material in that it provides an extremely long life expectancy which results in high reliability. The lifetime of VIMVAR-(AISI) 9310 steel gears is expected to be 50 times that of conventional air melt steel. The inboard end of each star gear 50 defines a first reduction gear which meshes with the sun gear 32 on the input quill shaft 30. The outboard end of each star gear 50 defines a first reduction pinion which meshes with an output sun gear 56 at the end of an output quill shaft 54 which is coupled to the output shaft 12. the output shaft 12 is, of course, rotatably supported within the output shaft bearing support 20.

Figure 2:
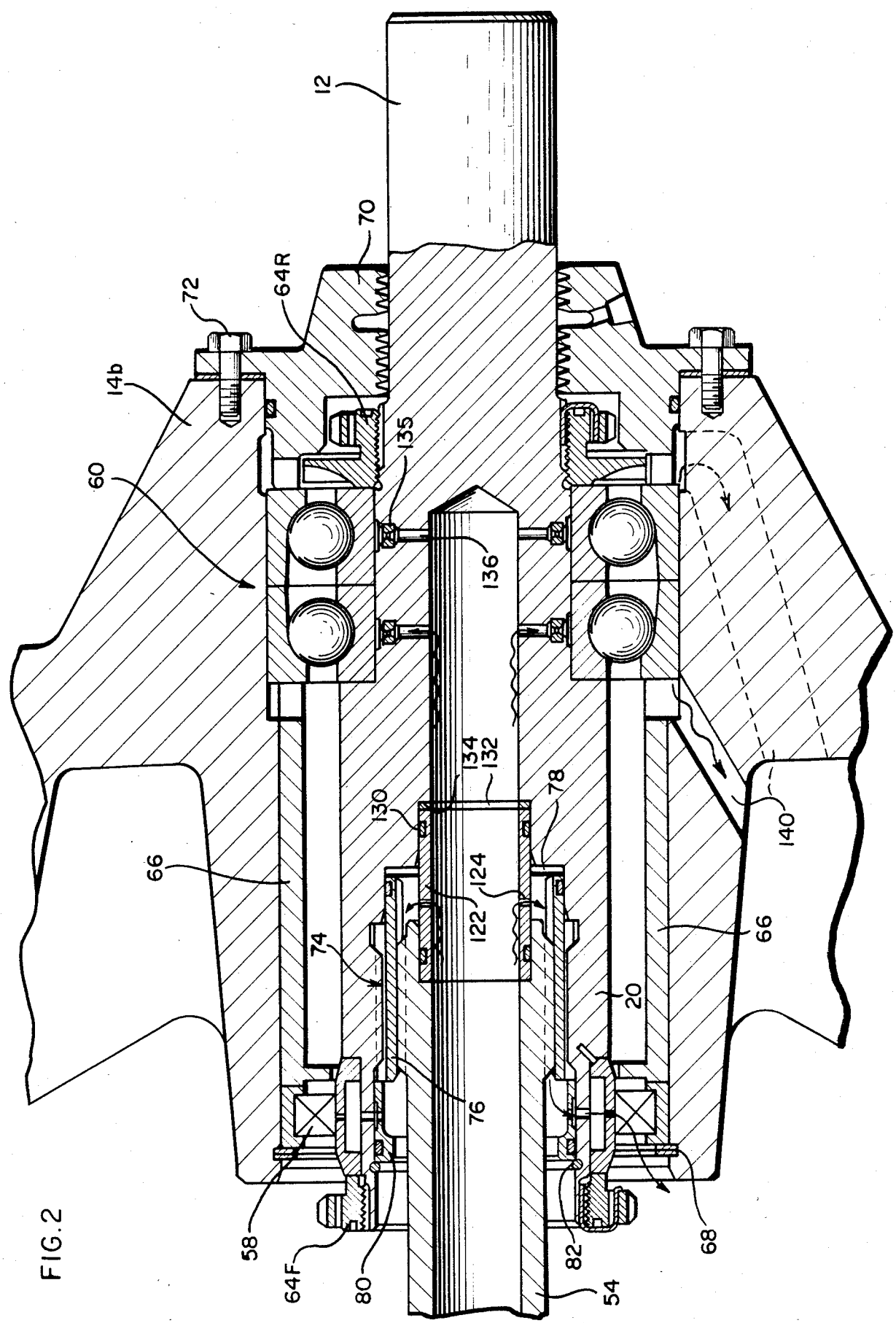
FIGS. 2 and 3 are an enlarged, cross-sectional side views of the transmission as viewed, respectively, along line 2—2 and line 3—3 of FIG. 1.

Turning to FIG. 2, the bearing support area, (a part of shaft 12) 20 carries a plurality of roller bearing elements 58, at the inboard end, and a set of duplex ball bearings 60, at the outboard end. Two locking assemblies 64F and 64R hold the inner race of each of the bearings in place relative to the output shaft 12. A spacer element 66 axially positions the two bearings. The forward bearings 58 are fixed in place relative to the transmission casing 14b by snap rings 68, and the rearwardly disposed ball bearings 60 are fixed in place relative to the casing by a combination locking cap and oil seal 70 which itself is coupled to the transmission casing by bolts 72. Much as in the case of the input quill shaft 30, the output quill shaft 54 is joined to the output shaft 12 by a splined coupling 74. This coupling includes a coupling collar 76, which is disposed between the splined end of the output quill shaft 54 and splines at the inside surface of a counter-sink bore 78 at the inboard end of the output shaft 12. A collar lock 80 held in place by a snap ring 82 holds the coupling collar in place relative to the output shaft 12.

From the foregoing description and as shown in FIGS. 1, 2, and 3 it should be clear that each quill shaft's 30 and 54 only contact with the apparatus of the transmission 10 is through the teeth of the sun gears 32 and 56 and the splined couplings 84 and 74. Thus, each quill shaft is bearingless and receives radial support only from star gears 50 and spline couplings 84 and 74. Since the star gears 50 rotate within the "carrier" formed by the fixed support member 28 and the back plate 52, the radial position of the sun gear end of each quill shaft nutates or precesses through a closed path determined by the "centers 55" of the star gears 50 and the contacting teeth in the gear meshes (See FIG. 4). Similarly, since the splined end of each quill shaft 30 and 54 is coupled to the output shaft 82 of the prime mover or the inboard end of the output shaft 12 of the transmission 10, the radial position of the splined end of each quill shaft is determined by the eccentricity of the axes of the turbine output shaft of the transmission output shaft. Thus, the present invention avoids periodic deflection or the imposition of forces on the input or the output shaft bearings due to misalignment problems as described in the Background of the Invention section above. In other words, the two quill shafts 30 and 54 can be said to be "free-floating" radially relative to the three star gears 50, and axially relative to the output shaft 82 of the prime mover or the output shaft 12 of the transmission 10.

The lubrication system for the two floating quill shafts 30 and 54 will be explained using FIG's. 2 and 3. It will be recalled that the fixed carrier support 28 positions and carries, at its inboard end, a base cap 40 and, at its outboard end, three bearing supports or mounts 34 for the inboard star gear bearings 71F. It will also be recalled that each star gear 50 is supported at each of its ends by roller bearings 71F and 71R held at each end of the "carrier", and that each end of each compound star gear 50 meshes with one of the sun gears 32 and 56 at the ends of the two quill shafts 30 and 54. Accordingly, a means must be provided to lubricate the two sun gears and the associated splined couplings 84 and 74. Those skilled in the art will understand that by lubricating the splines, spline fretting is avoided. For this purpose, an oil distribution manifold 100 is provided. Thus, lubricating the splines will avoid spline fretting in the present invention in which the splines are sufficiently free-flotating to accommodate the eccentricity of the input or output shafts. The manifold 100 is disposed within the "carrier" and is in fluid communication (by a hollow dowel 102) with the oil distribution assembly 38 bolted to the front end of the carrier support member 28. A plurality of jets 104 discharge oil from the manifold 100 to the teeth of the sun gears 32 and 56. Since the input sun gear 32 rotates at up to 10 times the speed (See FIG. 5) of the output sun gear 56, an oil dam 112 is provided to confine the oil released from the jets to the vicinity of the star gears 50. A radially disposed channel 106 in the manifold ducts oil to two oppositely disposed jets 108 which discharge oil into the interior of the two quill shafts 30 and 54 and to the opposite end of the shafts. The oil dam 112 also provides a land area to seat the manifold 100 within the carrier and holds the sun gear 32 within the "carrier" when the transmission is decoupled from the prime mover.

Referring now to FIG. 3, the sun gear end of each quill shaft 30 and 54 defines a central opening 110 and 111 which is aligned with the oil metering jets 108 carried by the oil manifold 100. Once the oil enters the interior of quill shaft 30 and 54, and once the quill shafts are set into rotation, an oil film will develop along the interior surface of quill shaft through the action of centrifugal force. The maximum thickness of the oil film developed is controlled, in part, by a plurality of openings 114 at the sun gear end of each quill shaft. These openings also serve to "vent" the shafts and to facilitate oil drainage when the shaft is removed. In the case of the output quill shaft 54, a separate insert 116 is provided which is received within the interior of the quill shaft. This insert 116 defines the opening 111 through which the oil enters the interior of the shaft and the openings 114 for controlling the maximum thickness of the oil film formed therein. This insert 116 is preferably pressed into the output quill shaft 54. The inboard end or the spline end of the input quill shaft 30 is provided with a spider-like insert 118. This insert 118 is used to carry one or more shims 120 and to meter oil to the splines of the coupling. The shims 120 are used to set the axial position of the input quill shaft 30 between the input shaft 82 and the radial leg of the oil manifold 100 which as shown in FIG. 3 provides a stop for axial positioning of quill shaft 30. In other words, the clearance between the coupling collar lock 88 and the input quill shaft 82, on one hand, and the input quill shaft and the stop or the radial leg of the oil manifold 100, on the other hand, can be adjusted by the use of shims 120 carried by the insert 118. It should also be understood that the shims allow one to properly align the mating of the sun gear teeth and the axial "float" of the input quill shaft 30 and end clearance with the stop or the radial leg of manifold 100.

Turning now to the output quill shaft 54, the axial spacing of the output quill shaft relative to the output shaft 12 is adjusted by means of a sleeve 122 and a shim 132 carried at the joint between the outboard end of the output quill shaft and the inboard end of the output shaft 12. This sleeve 122 is provided with a plurality of precision jet holes 124 for metering oil from the interior of the output quill shaft 54 to the output coupling 74. This sleeve 122 also carries two O-rings 130 for providing an oil seal between the interior surface of the output quill shaft 54 and the output coupling 74. Effectively, these O-rings 130 ensure that the oil film or layer, that is building up at the interior of the output quill shaft, flows through the ports 124 in the sleeve 122, an to jets 138 in the output shaft 54. The effective length of the output quill shaft 54 and output shaft 12 combination may be adjusted by the insertion of shims 132 positioned between the sleeve 122 and a shoulder 134 defined within the bore 78 of the output shaft 12. Once the oil leaves the oil distribution sleeve 122 and flows past the spline, defined by the output quill shaft 54 and the inboard end of the output shaft 12, it is free to flow into the roller bearing elements 58. Other oil ports 136 are provided at the outboard end of the bore 78 defined within the output shaft 12. Oil distribution jets 138 fed by those ports 136 distribute oil to the ball bearings 60. Oil flowing out of the ball bearings drains through channels 140 defined within the end of the transmission casing 14b.

From the foregoing, it will be observed that numerous variations and modifications may be affected without departing from the true spirit and scope of the novel concept of the invention. For example, although the invention has been described in detail in the specific environment of a splined quill shaft and a simple sun in-sun out transmission, the basic principles of the invention are equally applicable to a journaled quill shaft or more complex geared transmission. Similarly, although the distribution of oil within the quill shaft in the embodiment described was towards one-end of the quill shaft, distribution may be affected in only two directions without departing from the basic principles of the invention and the novel and unusually functional apparatus that is the subject of the invention. Thus, it should be understood that no limitation with respect to the specific apparatus illustrated herein is intended or should be deferred. It is, of course, intended to cover by the the appended claims all such modifications as fall within the scope of the claims.

What is claimed is as follows:

1. Apparatus for transmitting rotational energy from a prime mover having a first shaft to a torque load driven by a second shaft, comprising:
   a. a third shaft disposed coaxially between said first shaft and said second shaft;
   b. non-helical spur gear train means, having at least three compound star gears, for rotating said second shaft, each of said star gears defining a first reduction gear and a first reduction pinion, said first reduction pinions being rotationally coupled to said second shaft;
   c. a first non-helical spur gear, meshing individually with said first reduction gears, at one end of said third shaft; and
   d. coupling means for coupling the opposite end of said third shaft to said first shaft,
   whereby the pitch circle of said first non-helical spur gear remains substantially tangent to the pitch circles of said first reduction gears.

2. The apparatus set forth in claim 1, wherein said non-helical spur gear train means includes:
   a. a fourth shaft disposed coaxially between said third shaft and said second shaft;
   b. a second non-helical spur gear, meshing individually with the first reduction pinions defined by said star gears, at one end of said fourth shaft; and
   c. means for coupling the opposite end of said fourth shaft to said second shaft,
   whereby the pitch circle of said second non-helical spur gear remains substantially tangent to the pitch circles of said first reduction pinions.

3. The apparatus set forth in claim 2, wherein said third shaft is substantially hollow with an opening at each of its ends and wherein said non-helical spur gear train includes:
   a. a carrier for rotationally supporting said star gears substantially equi-distant from the axis of said first shaft and said second shaft; and
   b. oil distribution means for supplying lubricating fluid to said star gears and to said first and said second non-helical spur gears, said oil distribution means including a distribution jet which is fixed in position between said first spur gear and said second spur gear, for discharging lubricating fluid to the interior of said third shaft,
   whereby said means for coupling the opposite end of said third shaft to said first shaft is supplied lubricating fluid through the interior of said third shaft.

4. Apparatus for transmitting rotational energy from prime mover having a driving shaft to a reduction gear train having three compound non-helical star gears, comprising:
   a. a third shaft;
   b. coupling means, at one end of said third shaft, for coupling said third shaft to said driving shaft; and
   c. a first non-helical sun gear carried at the opposite end of said third shaft, said first sun gear meshing spur-wise with one of the two gears defined by each of said compound star gears, at least one of said first sun gear and star gears in each mesh being fully crowned,
   whereby the sun gear end of sid third shaft self-centers relative to said star gears.

5. The apparatus set forth in claim 4, wherein said reduction gear train includes:
   a. an output shaft;
   b. a second non-helical sun gear, carried at one end of said output shaft, meshing spur-wise with the other of said two gears defined by each of said compound star gears;
   c. bearing means, adjacent the opposite end of said output shaft, for rotationally supporting said output shaft,
   whereby each of said sun gears self-centers relative to said star gears.

6. The apparatus set forth in claim 5, wherein each of said sun gears and said star gear have teeth which are designed for recess contact action.

7. The apparatus set forth in claim 5, wherein each of said sun gears and said star gears have a contact ratio of between 2.20 and 2.56, and wherein at least two pairs of gear teeth on said sun gears and said star gears are substantially in contact at all times on all of said gears.

8. The apparatus set forth in claim 4, wherein said third shaft is substantially hollow.

9. The apparatus set forth in claim 4, wherein said coupling means includes a collar which is adapted to be removably connected to said driving shaft and which is splined to said one end of said third shaft.

10. The apparatus set forth in claim 9, further including: internal means, within said third shaft, for distributing lubricating fluid from the opposite end of said third shaft to said coupling means.

11. The apparatus set forth in claim 10, further including oil supply means for supplying lubricating fluid to the interior of said third shaft and to the exterior surfaces of said first non-helical sun gear.

12. The apparatus set forth in claim 11, wherein said third shaft is substantially hollow and defines in opening at each end, and wherein said oil supply means delivers lubricating fluid to the opening at said opposite end of said third shaft, whereby lubricating fluid is supplied to said coupling means.

13. The apparatus set forth in claim 12, wherein said reduction gear train includes a stop disposed at the opposite end of said third shaft, and wherein the axial space between said stop and said driving shaft is generally equal to the axial space between the corresponding ends of said first non-helical sun gear and the splined end of said third shaft, whereby said third shaft floates axially between said driving shaft and said stop.

14. The apparatus set forth in claim 14, wherein said stop carries an oil jet in fluid communication with said oil supply means, and wherein the opening at said opposite end of said third shaft is generally aligned to said oil jet.

15. Apparatus for coupling a prime mover to a non-helical spur gear train having at least three essentially identical compound non-helical spur gears rotationally disposed equilaterally relative to each other, comprising:
   a. a hollow shaft;
   b. spline means, at one end of said shaft, for rotatably coupling said shaft to a prime mover, said spline means defining a plurality of splines;
   c. non-helical spur gear means, connected to the other end of said shaft, for rotatably coupling said shaft to one end of each of said three non-helical spur gears, said non-helical spur gear means being adapted to mesh with and be supported by said three compound non-helical spur gears; and
   d. oil distribution means, carried within said shaft, for supplying lubricating fluid into the interior of said shaft and to the exterior surfaces of said non-helical spur gear means and said compound non-helical spur gears.

16. The apparatus set forth in claim 15, wherein said non-helical spur gear means comprises a fully crowned non-helical spur gear; and wherein said non-helical spur gear and said compound spur gears are fully recessed.

17. The apparatus set forth in claim 16, wherein said three non-helical spur gears are disposed rotatably in a carrier which is free to rotate relative to said hollow shaft.

18. Apparatus for transmitting rotational energy, from a prime mover having a first shaft, to a torque load driven by a second shaft, comprising:
   a. a bearingless third shaft disposed coaxially between said first shaft and said second shaft;
   b. non-helical spur gear train means, having at least three compound star gears, for rotating said second shaft, each of said star gears defining a first reduction gear and a first reduction pinion, said first reduction pinions being rotationally coupled to said second shaft;
   c. a first non-helical spur gear, meshing individually with said first reduction gears, at one end of said bearingless third shaft to radially support said bearingless third shaft; and
   d. coupling means for coupling the opposite end of said bearingless third shaft to said first shaft,
   whereby said bearingless third shaft is free-floating while the pitch circle of said first spur gear remains substantially tangent to the pitch circles of said first reduction gears.

19. The apparatus set forth in claim 18, wherein said non-helical spur gear train means includes:
   a. a bearingless fourth shaft disposed coaxially between said third shaft and said second shaft;
   b. a second non-helical spur gear, meshing individually with the first reduction pinions defined by said star gears, at one end of said fourth shaft to radially support said bearingless fourth shaft; and
   c. means for coupling the opposite end of said fourth shaft to said second shaft,
   whereby said bearingless fourth shaft is free-floating while the pitch circle of said second non-helical spur gear remains substantially tangent to the pitch circles of said first reduction pinions.

20. Apparatus for transmitting rotational energy from prime mover having a driving shaft to a reduction gear train having three compound non-helical star gears, comprising:
   a. a bearingless third shaft;
   b. coupling means, at one end of said bearingless third shaft, for coupling said bearingless third shaft to said driving shaft; and
   c. a first sun gear carried at the opposite end of said bearingless third shaft, said first sun gear meshing spur-wise with one of the two gears defined by each of said compound star gears to radially support said bearingless third shaft, at least one of said first sun gear and star gears in each mesh being fully crowned,
   whereby the sun gear end of said third shaft self-centers relative to said star gears.

* * * * *